UNITED STATES PATENT OFFICE.

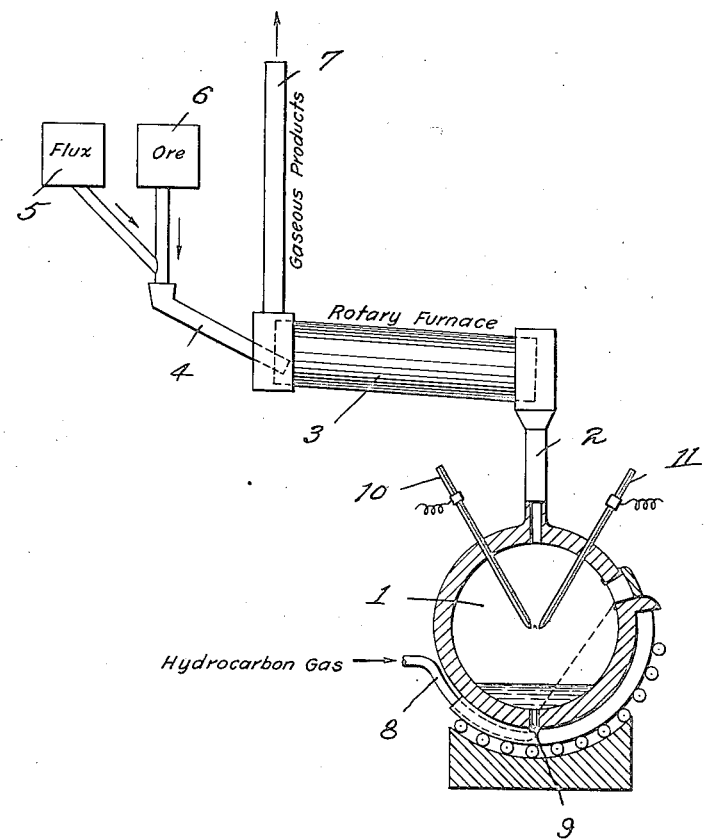

WALTER E. F. BRADLEY, OF NEW YORK, N. Y.

METHOD OF PRODUCING IRON AND STEEL.

1,422,733.    Specification of Letters Patent.    Patented July 11, 1922.

Application filed July 17, 1918. Serial No. 245,368.

*To all whom it may concern:*

Be it known that I, WALTER E. F. BRADLEY, a citizen of the United States, residing in New York, county and State of New York, have invented certain new and useful Improvements in Methods of Producing Iron and Steel, of which the following is a specification.

The present invention relates to the direct production of iron and steel from material containing iron chemically united with oxygen, such as for example, hematite and other oxide or carbonate ores of iron, magnetic sands, iron concentrates and the like. For the purposes of the invention to be herein described, such materials may be regarded and designated as ores.

The production of iron and steel from ore, whether accomplished by a direct process or effected indirectly, as by means of the initial production of pig iron in the blast furnaces, requires among other important features a reducing agent and an operation by which the ore is exposed to chemical reaction with the reducing agent. It is also necessary that a temperature at which reduction will occur be maintained, and as the reduction of iron oxide is in the nature of an endothermic chemical action, it is apparent that some source of heat, capable not only of taking care of extraneous heat losses, but also of supplying the chemical heat units of reduction, must be provided. The supply of this heat may be accomplished in part by the combustion of the reducing agent and the remainder be made up by the combustion of fuel, or by extraneous heat energy developed, for example, electrically.

From a consideration of the attempts already made to solve the problem of commercial production of high grade iron and steel directly from ore, it appears that practically every reducing agent, heat source and mechanical treatment known to metallurgy, has been applied without success, and therefore if present knowledge contains the elements necessary to success, the solution of the problem requires an improved association or correlation of the several elements by which the various functions are performed.

According to my invention, I employ what I believe to be the most advantageous reducing agent, a more economical generation and utilization of heat, and the most efficient manner of subjecting the ore to chemical reaction with the particular reducing agent employed.

Solids, liquids and gases of numerous kinds have all been proposed as reducing agents. I prefer to avoid commingling solid or fixed carbon with the ore, on account of the impurities and ash which it introduces into the system. Reducing agents in liquid state are difficult to apply. Among the reducing gases which have been proposed, carbonic oxide has perhaps been favored by most experimenters. This gas I find objectionable for many reasons, but chiefly on account of the fact that its product, after absorption of oxygen from the ore, becomes an oxidizing agent at the temperatures which are otherwise essential for commercial reduction on a rapid and economical scale. The reducing agent which I employ and which I have found to be capable of producing under proper conditions, high grade iron and steel directly from the ore, is in the form of a hydrocarbon gas, or in other words, a gas containing carbon but lacking oxygen. Such gas is able, when properly employed, to rapidly and economically reduce iron oxides without, at the same time, forming objectionable quantities of carbonic acid in the presence of the reduced iron. When procured in the form of natural gas, it constitutes one of the cheapest of all reducing agents and one which is capable of being introduced into the system with little or no practical difficulties, as it is not subject to change of state under the conditions of operation and contains harmful impurities only in most negligible quantities.

The use of natural gas as a reducing agent is not in itself a new proposal, but so far as I know, its use has never been proposed under attending conditions which lead to any practical success. In order that it may have the desired reducing action, it must be applied to the ore without the admission of air which would be extremely detrimental on account of the chemical equilibria of oxidation products thereby produced. The presence of nitrogen is further detrimental for similar reasons. In order to supply the heat units absorbed in the dissociation of the hydrocarbon gas, and in the reduction of the oxide of iron, while at the same time avoiding the introduction of oxygen from the atmosphere, I find that the electric arc furnace is practically the only apparatus which can be employed economically. At the same time, however, it has been recognized that all prior attempts to apply the electric furnace to the reduction of iron oxide, have met with failure, so far as commercial economy is concerned. In order to be used economically, it is necessary that the reduction proceed rapidly and thoroughly, and that the slagging of impurities, as well as the separation of the slag from the reduced iron should occur with a high degree of efficiency. The importance of these conditions will be readily understood when it is borne in mind that the total heat radiation loss per ton of iron produced depends directly upon the time consumed.

These requirements are satisfied according to the present invention by passing the hydrocarbon gas through the body of the material maintained at a high temperature. This high temperature is maintained, and the heat necessary to make up the deficiency is supplied, by means of an electric arc within the reducing space or chamber.

In this operation the material is molten, and the passage of the gas through the molten mass maintains the latter in constant agitation, exposing fresh surfaces of the material to the heat of the arc and to the action of the gas. Before the gas is discharged from the reducing system, it is passed over the incoming material where preheating and a partial preliminary reduction occur, thus conserving heat and reducing agent. A relatively low fusion point flux thoroughly mixed in finely divided form with the finely ground ore is employed. This makes a fluid slag, which absorbs impurities such as phosphorous and sulphur and facilitates the separation of the slag from the reduced metal. I find that the introduction of hydrocarbon gas into the molten mass is attended with great practical difficulty unless special provision is made for the construction and operation of the tuyère through which the gas is passed into the molten mass. Also the commercially successful operation of such a system is in my opinion largely dependent upon the selection or designing of a particular type of furnace, not only with respect to the materials employed in its construction, but as well in the manipulation thereof. These important considerations and other features of especial moment in the direct production of high grade iron and steel from ore, will be more clearly understood by reference to a specific embodiment of my invention which will serve as an example of how the process may be carried out.

The accompanying drawing shows in purely diagrammatic form so much of the system as is necessary to a proper understanding of the present invention.

In said drawing, 1 indicates an electric arc furnace, 2 the feed conduit leading thereto, 3 a rotary drum furnace discharging to said feed conduit 2, 4 the feed conduit for introducing to furnace 3 the ground flux and ore from hoppers 5 and 6, while 7 may represent the stack by which gaseous products of the system are finally discharged. Hoppers 5 and 6 are assumed to be properly supplied with finely divided flux and ore which pass therefrom into the supply conduit 4 from which they are introduced into the rotary drum furnace 3. In passing through the furnace 3, the flux and ore are thoroughly mixed by tumbling and sliding movement imparted to them by the rotation of the drum, and the mixture is discharged through the feed conduit 2 into the interior of the electric furnace 1. The electric furnace is closed to the atmosphere and the hydrocarbon gas such as, for example, natural gas, or methane, is introduced from a suitable source such as supply pipe 8 through tuyère 9. The charge during the reducing stage covers the mouth of tuyère 9, so that the gas passes upwardly through it. At the high temperature maintained by the electric arc between electrodes 10 and 11, the charge is in a state of fusion.

The temperature at which the hydrocarbon gas is here exposed, effects dissociation of the gas in the presence of the iron oxide, the chemical action involving the reduction of iron oxides by carbon and leaving the gas in the form of a mixture containing carbon monoxide and hydrogen, as will be more fully explained hereinafter. The mixture containing the carbon monoxide and hydrogen is discharged through the mouth of the electric furnace into the feed conduit 2, and thence it passes into the rotary drum furnace 3 where the ore and flux are being mixed. These gases leaving the electric furnace 1 at a high temperature, and still possessing reducing properties, preheat the ore and flux which is being mixed within the rotary drum furnace 3, and effect a partial preliminary reduction of the iron oxide contained therein. Assuming, for example, the treatment of magnetite, the chemical action taking place within the preheating furnace 3 may be represented by the equation—

$$2CO + 8H + Fe_3O_4 = Fe + 2FeO + CO + CO_2 + H_2O + 6H$$

The remaining gas containing carbon monoxide, carbon dioxide, water vapor and free hydrogen, passes out through stack 7 and may be used as fuel to supply heat for any purpose.

Referring again to the final reduction which occurs in the electric furnace 1, the chemical action may be represented as follows:

$$Fe+2FeO+2CH_4=3Fe+2CO+8H$$

A flux which I have found satisfactory for the operations herein described, is one containing, or made up of sodium carbonate or sodium chloride. The electric furnace is preferably of the basic lined type having for example, a lining of pure magnesia or magnesite brick. To protect this lining from attack by the flux or slag, it is desirable to maintain a basic condition in the slag. The sodium carbonate or chloride answers this purpose alone or it may be supplemented by additional basic material which need not have such low melting point, such as lime, magnesia, or the like. The amount and composition of the flux depend on the amount of $SiO_2$, $Al_2O_3$, and other impurities in the ore.

As already stated, the successful use of hydrocarbon gas as a reducing agent, requires a particular construction and manipulation of the electric furnace, an important detail of which resides in the provision of a suitable form of tuyère through which the gas is introduced into the molten charge. I have found metal to be entirely unsuitable as a material for the construction of the tuyère, because of its high heat conductively and relatively low fushion point. When artificially cooled, it tends to become stopped up. At the temperatures employed, it is chemically acted upon by the carbon or reducing agent. Tuyères of refractory materials such as magnesia, silica and the like are chemically active, and furthermore are useless because they rapidly wear away or become stopped up. I find, however, that tuyères composed of carbon answer the requirements. They have comparatively low heat conductivity, withstand the high temperature to which they are subjected, and are protected from chemical action with the charge by the atmosphere of reducing gas which is passing through them.

When the reduction is complete, it is necessary to stop the flow of gas through the charge, since to continue the supply of gas would alter the resulting composition of the steel or iron, and would not permit of separating the slag and steel, due to the agitation. It is impossible to turn off the gas supplied to the tuyère while it is below the level of the liquid charge without causing the tuyère to stop up, therefore it is essential that the furnace be of the tilting type, so that the tuyère may be removed from below the level of the bath. The gas may then be turned off completely or partly as desired. The furnace is preferably arranged to have its intake or mouth suitably connected with the feed conduit 2 when the furnace is moved into receiving position, but permitting disconnection to be made for tilting the furnace and pouring off the slag and metal.

In the system shown, the supply of mixed ore and flux to the electric furnace takes place continuously over a considerable period of time during which the reduction is continuously proceeding. Thus the mixture is treated as fast as introduced and the entering fresh material is continuously delivered upon the surface of the molten mass, where it is most directly exposed to the heat of the arc and thus most effectively acted upon. The introduction of heat from the electrodes above into the charge beneath is in this way much more advantageously accomplished, than where the entire charge is introduced into the furnace before the heating stage begins. When the operations are proceeding properly and uniformly throughout the several parts of the system, the temperature within the electric furnace remains constant. As the various parts of the system are dependent upon each other with respect to chemical, thermal, and mechanical conditions, it is therefore apparent that uniformity of the operations can be obtained by proper adjustment of the gas supply, the rate of feed, and the supply of electric power with respect to each other.

Having deoxidized the ore and obtained the metal in substantially pure form, the slag containing the impurities is poured off, after which the necessary additions are introduced to make the quality of steel desired and the heat continued long enough to obtain the necessary commingling of the ingredients into a uniform homogeneous state. Carbon, manganese, nickle and any other ingredients required to make steel of a specified analysis can be added as alloys or compounds. Carbon can also be added by passing an additional quantity of hydrocarbon gas through the steel after the removal of the slag.

By this process, it is possible to produce a very high grade of pure iron or steel of practically any analysis desired.

I claim:

1. The method of reducing iron ore which comprises passing a hydrocarbon gas through a molten mass of material being treated and supplying heat from an extraneous source to maintain the mass in molten condition.

2. The method of reducing iron ore which comprises passing a hydrocarbon gas through a molten mass of material being treated in an electric furnace, and electrically supplying deficient heat for maintaining the mass in molten state.

3. The method of reducing iron ore which comprises adding ore to a molten mass of material being treated while passing a hydrocarbon gas through the molten mass and supplying heat from an extraneous source to maintain the material in molten condition.

4. The method of reducing iron ore which comprises introducing the iron ore into a tilting electric furnace provided with a tuyère, heating the charge electrically while over the tuyère to maintain fusion of the charge, simultaneously passing a reducing gas through the tuyère into the charge being fused, and tilting the furnace to a position in which the tuyère is removed from the fused charge upon completing reduction, to discontinue the passage of reducting gas through the charge.

5. The method of reducing ores of iron which comprises passing finely divided ore and flux continuously through a rotary drum furnace and into an electric furnace, fusing the mass in the electric furnace and simultaneously passing a reducing gas in opposite direction into the electric furnace, through the fused charge of ore and flux therein and through the rotary drum furnace.

6. The method of obtaining a refined product from ores of iron which comprises mixing finely divided ore and flux, introducing the mixture into an electric arc furnace, fusing the mixture within the electric arc furnace by heat from the arc, whereby impurities are absorbed by the flux, passing a hydrocarbon gas through the fused mass and incoming finely divided material during fusing to effect reduction to metallic state, discharging the resultant gas, containing carbon monoxide and hydrogen, from the electric furnace over the finely divided ore and flux during the mixing operation to preheat them and partly reduce the ore prior to fusion in the electric furnace, and separating the slag from the refined product of reduction.

7. The method of obtaining a refined product from ores of iron, which comprises thoroughly mixing the finely divided ore with a flux of lower fusion point, heating the mixture to first fuse the flux and then the remainder of the mass, to absorb impurities prior to fusion or ultimate reduction, passing a hydrocarbon gas through the fused mass and incoming finely divided material to effect reduction during the fusing operation and separating the slag from the refined product of reduction.

8. Continuously and cumulatively delivering iron ore upon the surface of the charge contained within an electric arc furnace, simultaneously maintaining an electric arc within the furnace entirely above the surface of the charge for fusing and reducing the mass during the continued supply of ore, interrupting at intervals the supply of ore, and discharging the reduced product during such intervals of interrupted supply.

9. Continuously and cumulatively delivering iron ore upon the surface of the charge contained within an electric arc furnace, continuously supplying hydrocarbon gas to the increasing charge, maintaining an electric arc within the furnace entirely above the surface of the charge for fusing and reducing the mass during the continued supply of ore, interrupting at intervals the supply of ore and hydrocarbon gas and discharging the reduced product during such intervals of interrupted supply.

10. The method of reducing iron ore, which comprising continuously passing a hydrocarbon gas through a molten mass of iron and slag in an electric furnace, continuously and cumulatively supplying ore to said electric furnace, interrupting at intervals the supply of ore, and discharging the reduced product during such intervals of interrupted supply.

11. The method of conducting the operations of reducing ore, which comprises feeding the charge to an electric furnace, delivering electric power thereto, supplying a reducing gas to the charge therein, and correlating or coordinating the rate of feed, the supply of gas and the delivery of electric power to maintain uniform operation.

WALTER E. F. BRADLEY.